US006402200B1

(12) United States Patent
Myers (10) Patent No.: US 6,402,200 B1
(45) Date of Patent: Jun. 11, 2002

(54) APPARATUS AND METHOD FOR MOVING MUD FLAPS TO A PROTECTED POSITION (76) Inventor: Raymond T. Myers, 10530 Mill St. - Box 16, Rockbridge, OH (US) 43149

( * ) Notice: Subject to any disclaimer, the term of this patent is extended or adjusted under 35 U.S.C. 154(b) by 0 days.

(21) Appl. No.: 09/832,460

(22) Filed: Apr. 11, 2001

(51) Int. Cl.[7] .............................................. B62D 25/18
(52) U.S. Cl. ...................................................... 280/851
(58) Field of Search .................................. 280/847, 848, 280/851, 154, 156, 159; 293/112; 296/198

(56) References Cited

U.S. PATENT DOCUMENTS

| 2,414,676 | A | * | 1/1947 | Taurman et al. | ............. | 280/851 |
| 2,721,760 | A | | 10/1955 | Lapham et al. | | |
| 3,165,360 | A | * | 1/1965 | Saxton et al. | ................ | 280/851 |
| 3,700,260 | A | * | 10/1972 | Moore et al. | ................ | 280/851 |
| 3,837,672 | A | * | 9/1974 | Molby | ......................... | 280/851 |
| 3,905,616 | A | * | 9/1975 | Tamburino et al. | .......... | 280/851 |
| 4,113,269 | A | * | 9/1978 | Richardson et al. | ........ | 280/851 |
| 4,221,432 | A | | 9/1980 | Van Remortal et al. | | |
| 5,199,742 | A | * | 4/1993 | Götz et al. | ................... | 280/851 |
| 5,582,431 | A | | 12/1996 | Anderson | | |
| 5,676,389 | A | * | 10/1997 | Richardson | .................. | 280/154 |
| 6,139,062 | A | | 10/2000 | Meyer | | |
| 6,158,775 | A | | 12/2000 | Nickels | | |

FOREIGN PATENT DOCUMENTS

SU            1518163      * 10/1989    ................. 280/851

* cited by examiner

Primary Examiner—Frank B Vanaman
(74) Attorney, Agent, or Firm—Francis T. Kremblas, Jr.

(57) ABSTRACT

An apparatus and method for moving the mud flaps mounted on a truck from their normal planar operating position behind the truck's rear tires to a protected position engaging the rear tires. The mud flaps are connected to a mounting member movably connected to the underside of the truck and fixed to the mud flaps to cause the mud flaps to move from a normal operating position and into a generally U-shaped configuration engaging a rear tire. Further, with the mud flaps in the generally U-shaped configuration, selectively causing rotation of the rear tires in a clockwise or counterclockwise direction effectively causes the mud flap to be drawn over the rear tire between positions resting on a forward or rearward facing side of the tire.

9 Claims, 8 Drawing Sheets

APPARATUS AND METHOD FOR MOVING MUD FLAPS TO A PROTECTED POSITION

CROSS-REFERENCE TO RELATED APPLICATIONS (Not applicable)

STATEMENT REGARDING FEDERALLY SPONSORED RESEARCH OR DEVELOPMENT (Not Applicable)

Reference to a "Microfiche Appendix"

(Not Applicable)

BACKGROUND OF THE INVENTION

1. Field of Invention

This invention relates generally to devices which cause the movement of mud flaps mounted on truck vehicles between their normal position and a more protected position to reduce the occurrence of damage to the mud flaps during certain typical operating circumstances.

2. Background of Related Art

The present invention relates to a system mountable on a truck vehicle, such as a dump truck for example, to permit the mud flaps to be selectively moved into a safer position. Potential problems arise typically when the truck backs up to an unloading location or during the dumping of the load. In such circumstances, the mud flaps can be pinched forcibly against the rear tires and become damaged or torn away. The law requires mud flaps to be in good operable position to protect against the throwing of stones or other objects during travel on the roadways. Failure to have proper mud flaps carries a fine and other is penalties. Therefore, when a truck's mud flaps are torn away or in a damaged condition, the truck is effectively disabled for legal travel until the problem is repaired. This represents a considerable expense in lost productivity and labor.

The prior art includes many suggested devices and methods for alleviating this problem. Typical prior art devices to cure this problem are described in U.S. Pat. No. 6,139,062, U.S. Pat. No. 4,221,432, U.S. Pat. No. 5,582,431; and the patents cited in these patents.

Of these many prior art attempts to solve this problem, an inexpensive and relatively simple solution has escaped those skilled in the art. Many such prior devices are either of relatively complex construction, or relatively difficult to install, or lack sufficient reliable protection for the mud flaps in many situations which may be encountered or include a combination of these traits.

BRIEF SUMMARY OF THE DISCLOSURE

In accordance with the present invention, a mud flap mounting system provides a relatively simple construction which permits the mud flap to move between a normal planar configuration disposed behind the rear tires of a truck and a protected position engaging the rear tires to assume a generally U-shaped configuration. In this position the mud flaps are protected from damage under most circumstances which usually may occur. In a more preferred embodiment, the mud flaps may be further moved to a more protected position by causing the rear tires, to rotate counterclockwise or forwardly when the mud flap is in the U-shaped configuration frictionally engaging the rear tire described above. The forward rotation of the rear tires pulls the lower end of the mud flap completely over the tire to rest upon the forward facing circumference of the rear tire.

By reversing this action, the mud flap in the more preferred method may be moved upwardly and rearwardly to assume a similar, but oppositely directed U-shaped configuration frictionally engaging the rear tire. Then merely backing up the truck causes the rear tires to rotate in a clockwise direction which pulls the lower ends of the mud flaps rearwardly until they assume their normal planar configuration behind the rear tire.

The movement of the mud flaps into frictional engagement with the tire may be accomplished with several conventional constructions. These include, for example, rotating or pivoting the mounting means carrying the mud flap, or slideably moving the mounting means in a longitudinal direction relative to the length of the truck, thereby moving the mud flap forwardly or rearwardly.

In the more preferred embodiment, a shaft may be rotatably mounted to an underside of the truck and a mounting plate is fixed to the shaft so as to pivot with rotation of the shaft. The mud flaps are fixed at their upper end portions to the mounting plate structure. Therefore by selective rotation of the shaft, the mounting plate may be pivoted toward and away from the front of the truck to cause the mud flap to move between its normal planar operating configuration and into frictional engagement with the rear tire where it assumes a generally U-shaped configuration. In the latter position, the lower end of the mud flap is raised higher and moved forwardly compared to its normal planar operating configuration.

This U-shaped configuration position engaging the rear tire significantly reduces damage to the mud flap during backing up of the truck and during most unloading applications. The mud flap may be returned to its normal operating position by pivoting the mounting plate rearwardly to its original normal position.

However, when the mud flap is in this first U-shaped configuration engaging the rear tire, the truck operator may, at his option, drive forward a short distance. The frictional engagement between the rear tire and mud flap will pull the lower portion of the mud flap over to the forward facing circumference of the tire as earlier described. In this position the mud flap is fully protected during any unloading circumstance normally encountered.

To return the mud flap to its normal position, the truck operator may pivot the mud flap mounting plate toward the rear of the truck to draw the mud flap upwardly into a generally U-shaped configuration oppositely directed from the first described U-shaped configuration. Then upon backing up of the truck a short distance, the mud flap is drawn over the rear tire to resume its normal planar configuration behind the rear tire.

BRIEF DESCRIPTION OF THE DRAWINGS

FIG. 4-A is a view similar to that shown in FIG. 4 illustrating the mud flap being drawn further upwardly on the rear tire by the counterclockwise rotation of the tire upon driving the truck forwardly;

In describing the preferred embodiment of the invention which is illustrated in the drawings, specific terminology will be resorted to for the sake of clarity. However, it is not intended that the invention be limited to the specific term so selected and it is to be understood that each specific term includes all technical equivalents which operate in a similar manner to accomplish a similar purpose.

DETAILED DESCRIPTION OF THE INVENTION

The present invention relates to an apparatus for mounting mud flaps on a truck for movement between a normal operative position and a second position in which they are less susceptible to damage during backing up of the truck or the unloading of its contents. The latter is particularly applicable to dump trucks.

In accordance with the present invention, the construction of the mounting assembly is readily adapted for retrofitting existing trucks as well as for installation as part of the original manufacture of trucks or truck beds. The individual components are well-known and readily available.

Figure 1:
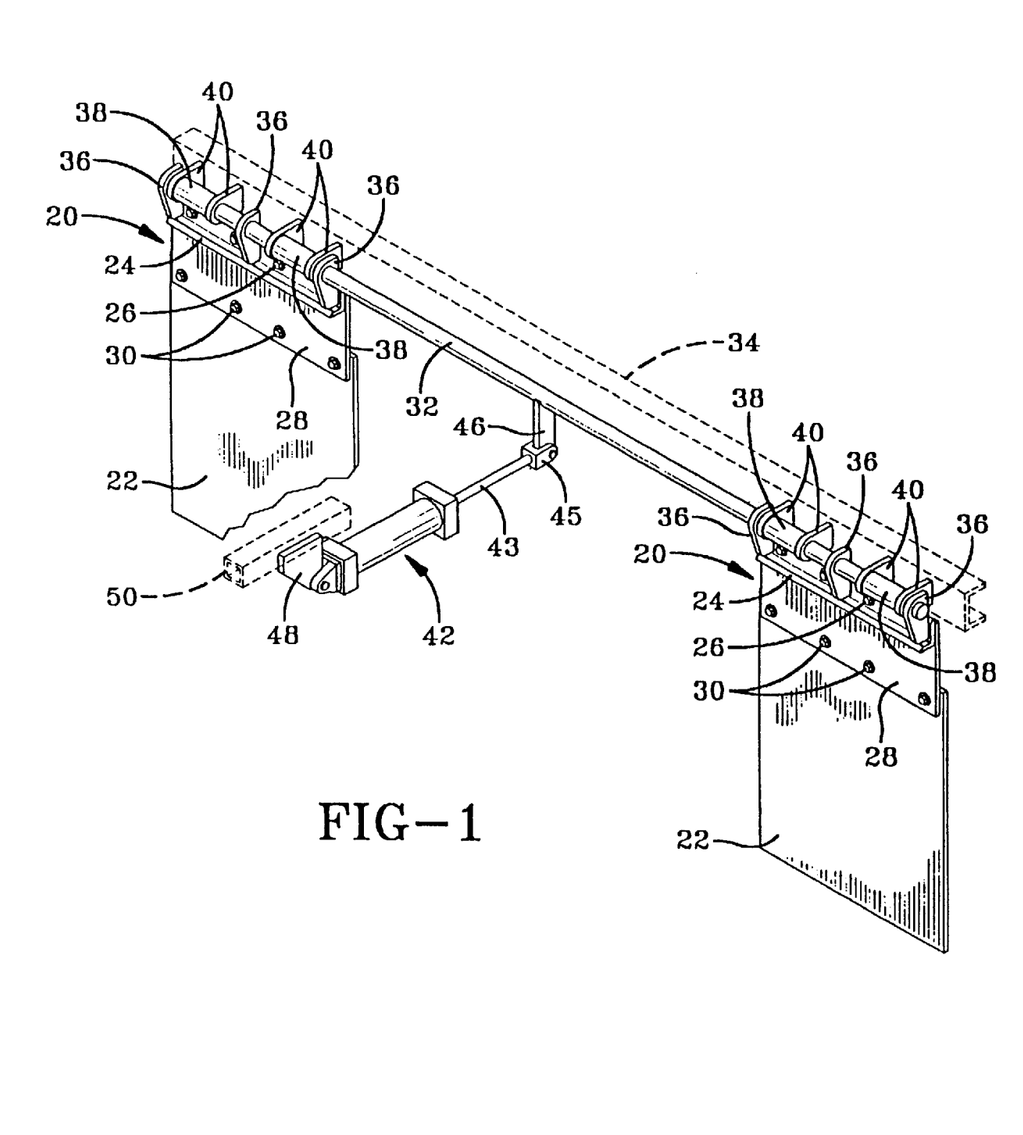
FIG. 1 is a perspective view of a preferred embodiment for mounting a pair of mud flaps to an underside of a vehicle frame for selective movement between a normal, vertically, planar position and second, more protected position in accordance with the present invention, the structure being shown apart from the remaining truck structure.

Referring to FIG. 1, a preferred embodiment of the present invention is shown, essentially standing apart from the remainder of a dump truck body. and includes a mud flap mounting assembly, referred to generally at 20, for each one of a standard pair of mud flaps 22. Each mounting member 20 includes an angle bar 24 which is bolted, such as at 26, or otherwise conventionally fixed, to a rigid plate 28. Mud flaps 22 are conventionally fixed near their upper edge to plate 28, such as by bolts 30 or any equivalent connecting or fixing means. Other structural forms may be adopted to provide the same purpose as the combination of angle 24 and plate 28.

A rotatably mounted shaft 32 may be mounted to and supported by one of the supporting or stiffening members conventionally provided on the underside of dump truck bodies, such as C-channel 34, shown in ghost lines in FIG. 1. Alternatively, if no convenient mounting support is appropriately located, a separate angle, C-channel or other equivalent mounting means may be provided and welded or otherwise conventionally fixed to the underside of the bed of the truck in lieu of channel 34.

Shaft 32 is mounted to a plurality of brackets 36. One bracket 36 is located at each end of each angle 26 and one is disposed intermediate the length of each angle 26. Each bracket 36 is conventionally fixed to a respective angle 26 by welding or the like. Two pair of conventional bearing members 38 are mounted on shaft 32 and are fixed to C-channel 34 to rotatably support shaft 32 in the selected position on the underside of the truck bed. Bearing members 38 are carried by brackets 40 which may be fixed to channel 34 in any conventional manner, such as welding for example.

Rotation of shaft 32 is preferably actuated and controlled by an actuator, such a cylinder and piston assembly 42. The reciprocal stroke of cylinder assembly 42 controls rotation of shaft 32 via a conventional U-shaped connector 45 fixed to a bar 46, which in turn is conventionally welded at its upper end to shaft 32. Cylinder assembly 42 may be mounted to the underside of the truck bed in any conventional manner, such as being pivotally mounted to a block 48, which in turn is welded to a bar 50. Bar 50 may be welded to a pair of spaced C-channels 52 conventionally provided on truck beds, such as shown in FIG. 2.

Other conventional means for operatively mounting the cylinder assembly 42 to the truck or for causing rotation of shaft 32 may be employed by those skilled in the art without departing from the spirit of the present invention. Similarly, it will be readily recognized by those skilled in the art that a separate shaft 32 for each mud flap as well as a single mounting plate extending across the width of the truck bed in lieu of the pair of plates 28 may be substituted without departing from the spirit of the invention.

Figure 2:
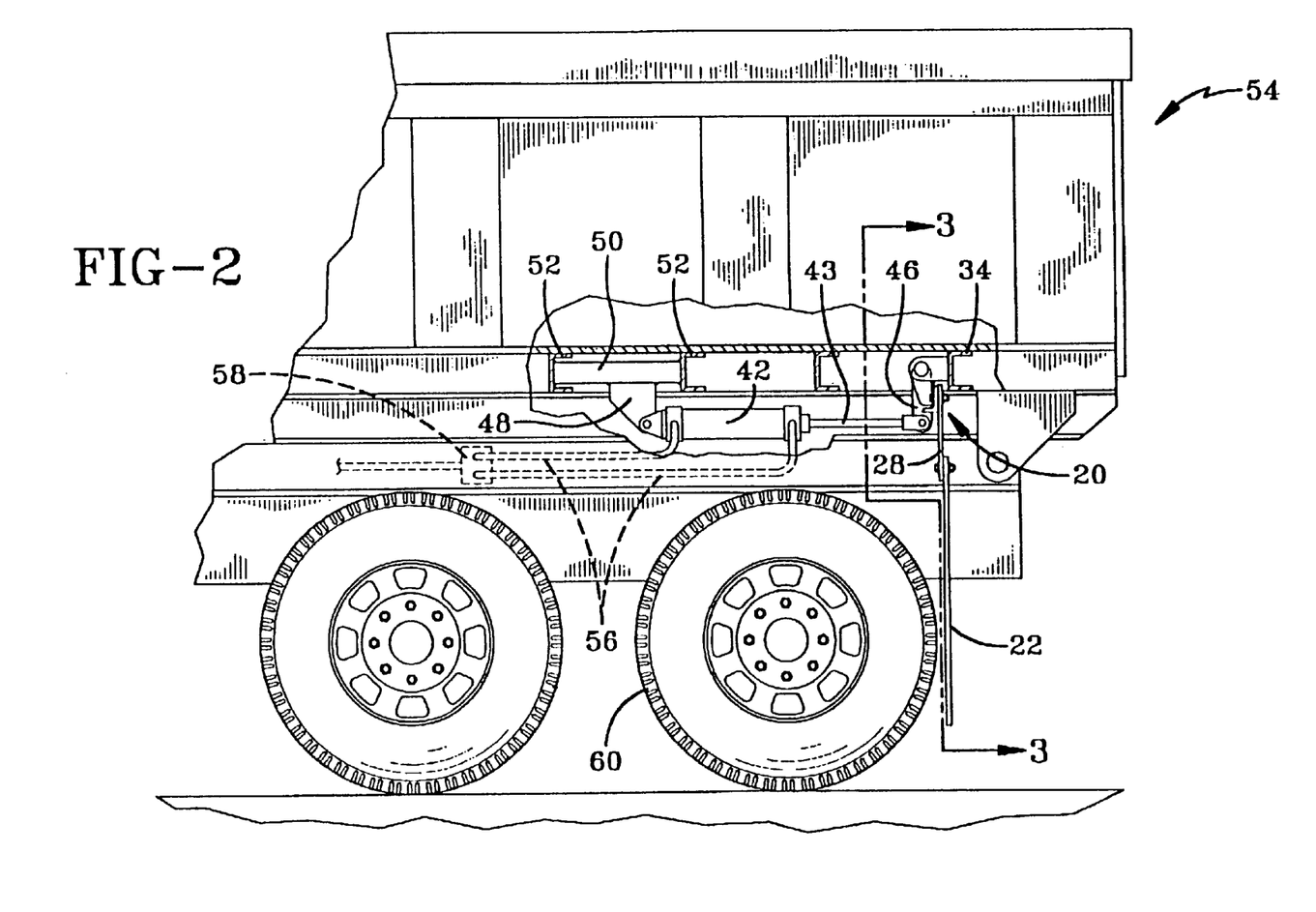
FIG. 2 is a partial side sectional view of the apparatus shown in FIG. 1 mounted on a conventional truck bed, portions of the sides of the truck are cut away to better view the embodiment shown.

Referring to FIG. 2, a portion of a conventional dump truck, indicated generally at 54, is shown to illustrate an embodiment of the present invention mounted thereto in an operative condition. The conventional features or parts of the truck are commonly well-known and will not be specifically described, except as they pertain to the present invention for purposes of brevity.

Figure 3:
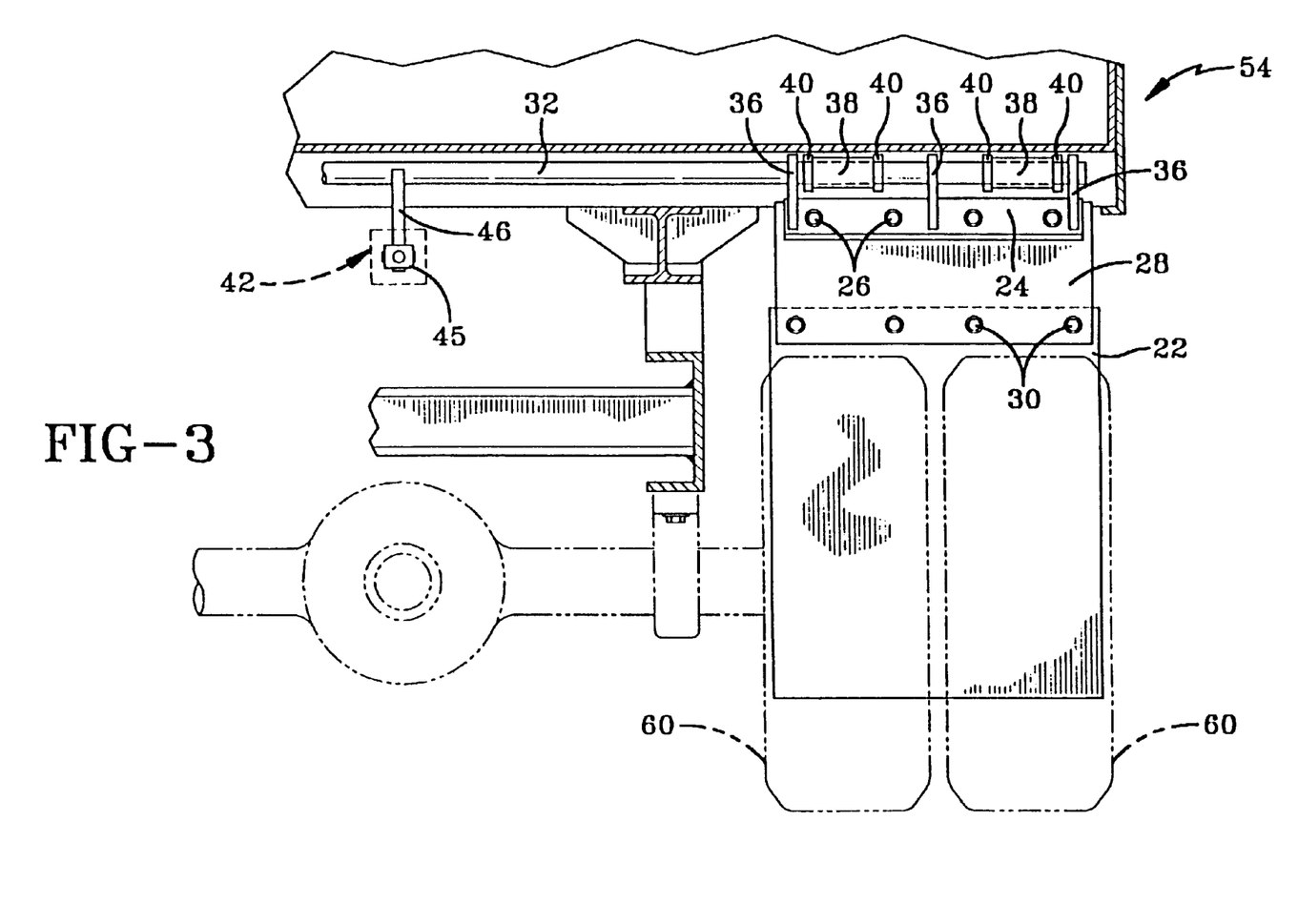
FIG. 3 is a partial front view of the embodiment in FIG. 2 with portions of the conventional truck bed illustrated by ghost lines.

As seen in FIGS. 2 and 3, cylinder assembly 42 is in an extended position with piston rod 43 extended rearwardly. This positions mounting plates 28 and mud flaps 22 in a generally vertical position for normal operation, i.e., a vertically extending planar configuration for road travel and closely spaced behind rear tire 60 in order to deflect stones or other debris.

Figure 4:
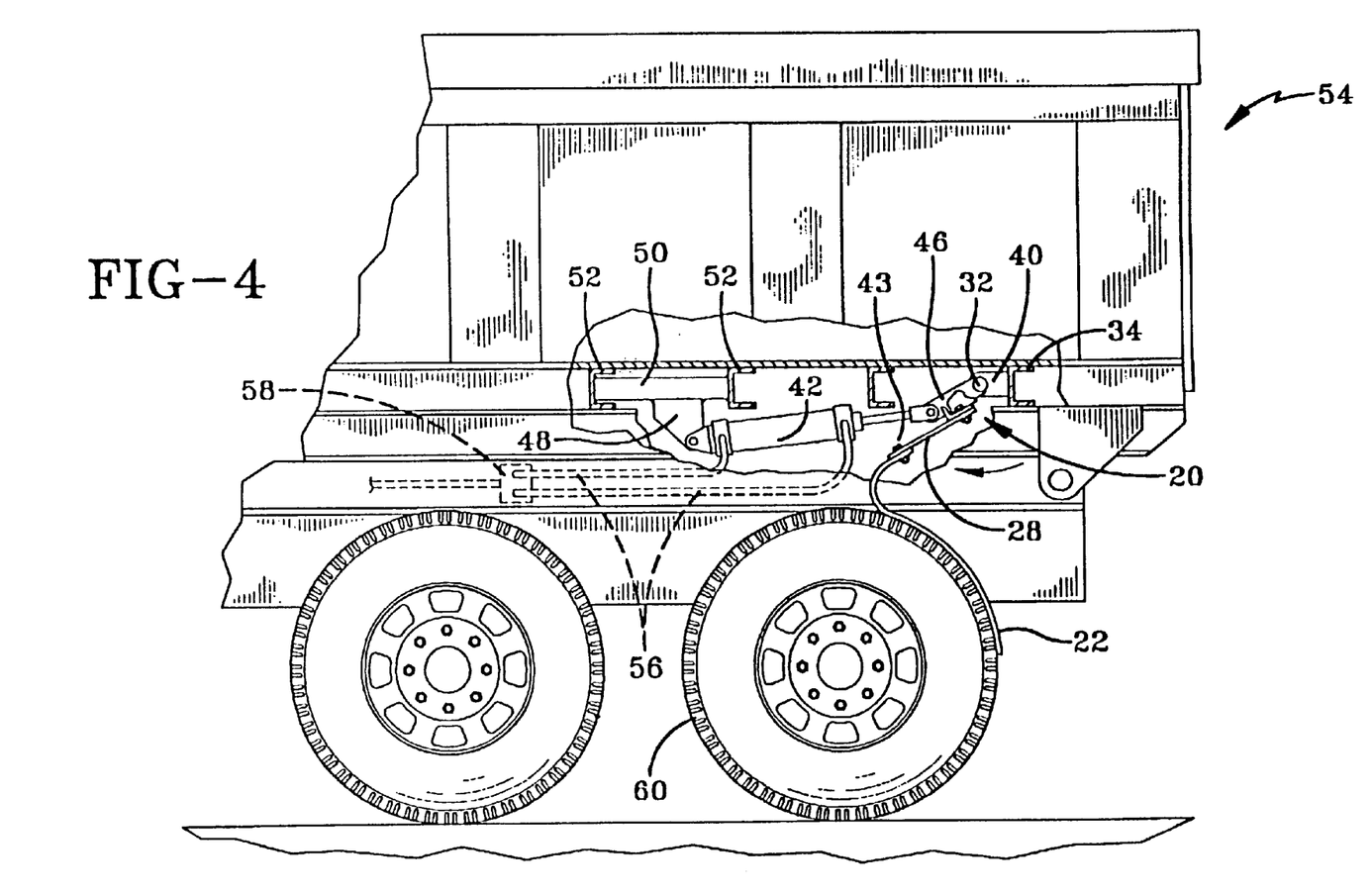
FIG. 4 is a partial side view, partially in section similar to FIG. 2, but illustrating the mud flap mounting plate pivoted forwardly and the mud. flap drawn into a generally U-shaped configuration engaging the rear tire.

Now referring to FIG. 4, the truck operator causes the actuator, cylinder assembly 42 in the preferred embodiment shown, to retract piston rod 43. This action pulls bar 46 forwardly and causes shaft 32 to rotate in a clockwise direction and in turn, pivots the mounting plate toward the forward end of the truck. Mud flap 22 is then carried toward rear tire 60 and into engagement with tire 60. Continued rotation of shaft 32 to approach approximately about a forty-five degree angle to the vertical, pulls mud flap 22 over the tire 60 and into a generally U-shaped configuration as shown in FIG. 4. It should be noted that the lower edge of mud flap 22 has been raised higher above the ground compared to the normal operating configuration shown in FIG. 2. Depending upon the selected dimensions of the parts involved, one may cause further forward rotation of shaft 32 toward a generally horizontal position to draw mud flap 22 further forwardly on the tire and raise the lower end thereof to a slight higher position. However, the position shown, or one close thereto, is sufficient to significantly reduce the occurrence of damage to or the tearing off of the mud flap 22 in a high majority of instances upon backing the truck and during many unloading applications.

Figure 4A:
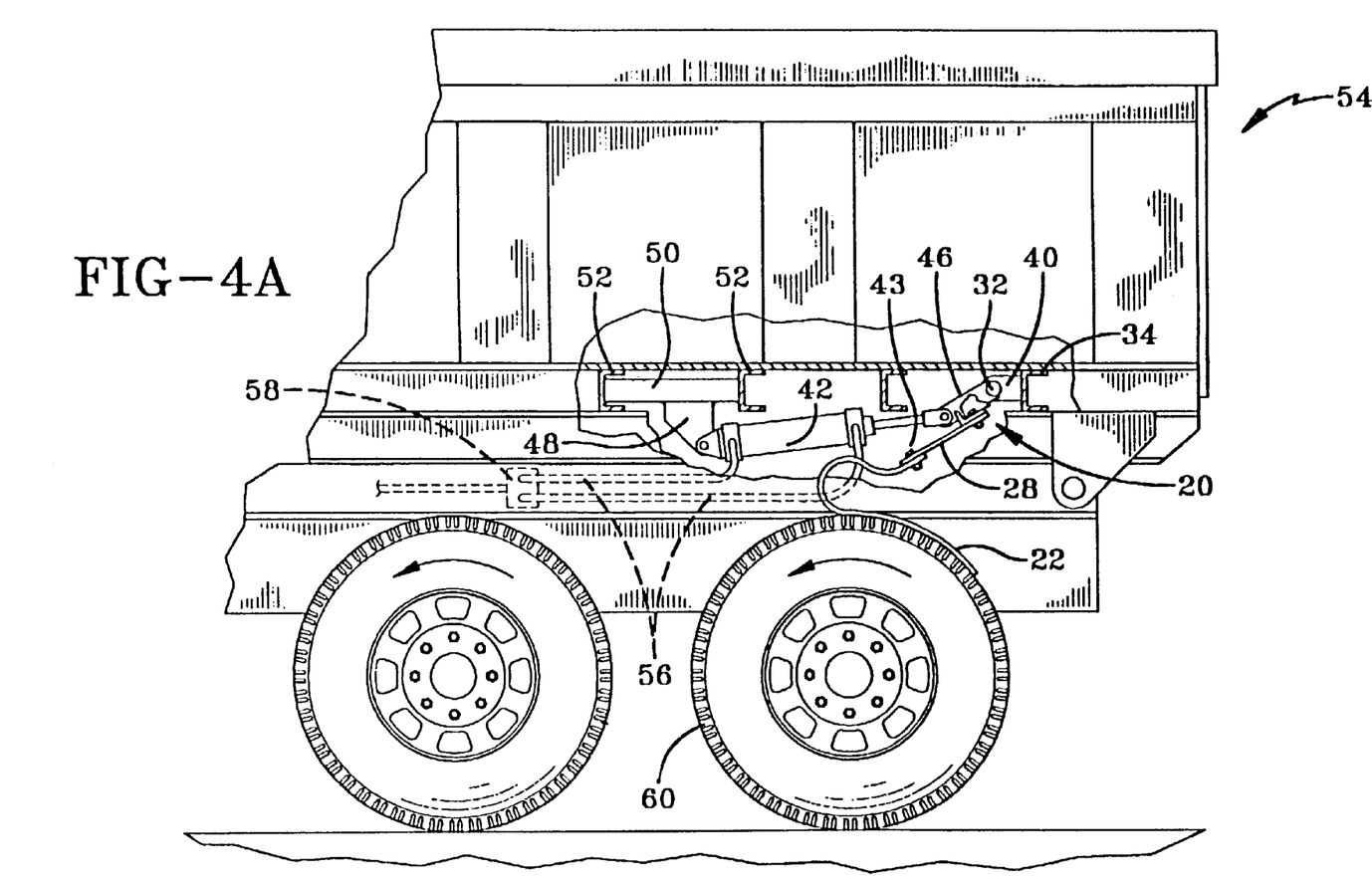
Figure 5:
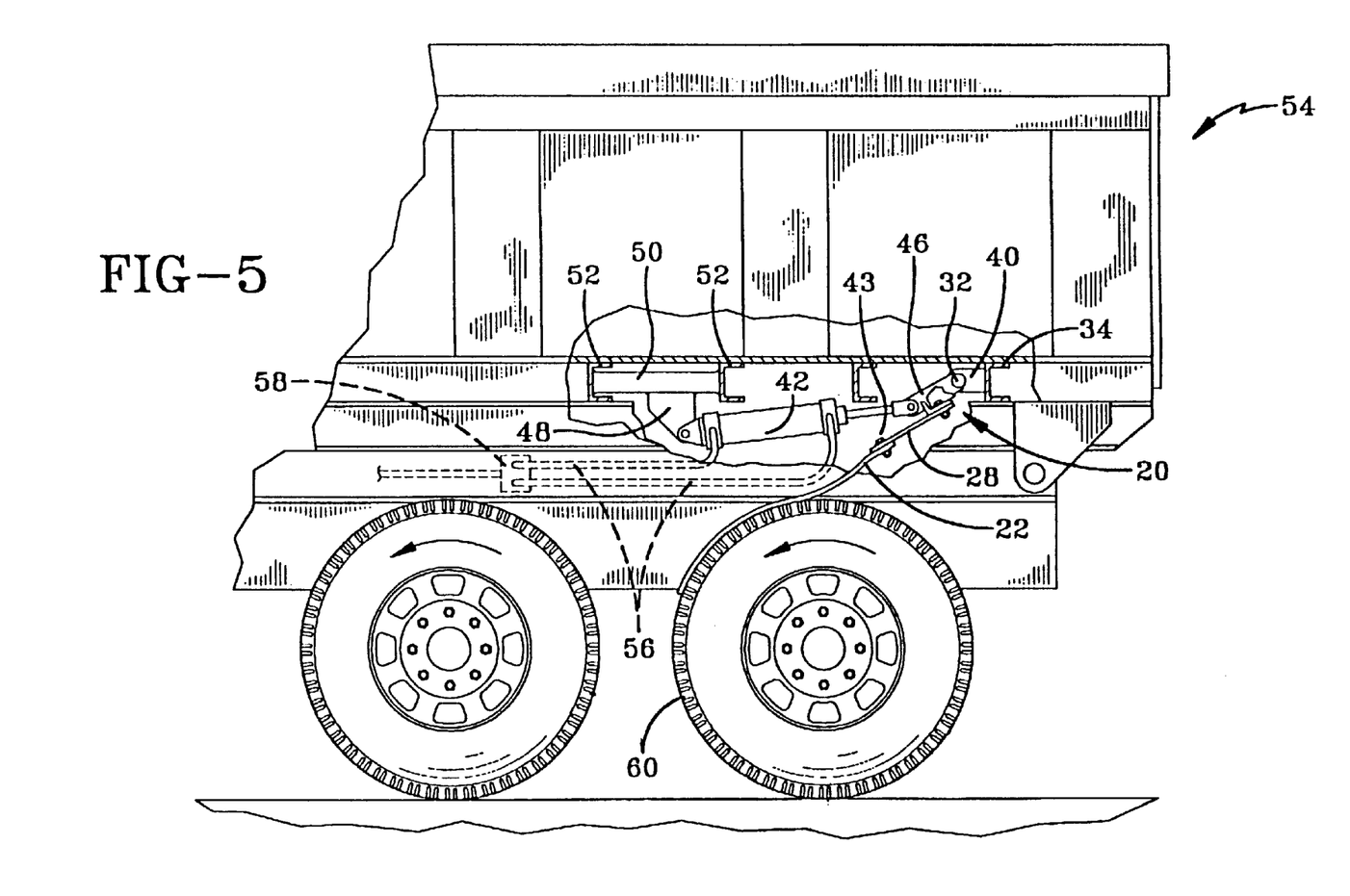
FIG. 5 is a view similar to FIGS. 4 and 4-A, illustrating the final position of the mud flaps in the most protected position which is obtained upon further driving the truck forwardly relative to FIG. 4-A.

Also, the position and configuration of mud flap 22 as shown in FIG. 4 is sufficient to permit the mud flap to be carried completely over the tire to the positions shown in FIGS. 4-A and 5 upon causing the rear tires 60 to rotate in a counterclockwise direction, preferably by driving the truck forward a short distance. This is possible because there is sufficient frictional engagement between the surface of the mud flap 22 and tires 60 when mud flap 22 is disposed in the general U-shaped configuration shown in FIG. 4.

While the position shown in FIG. 4 is highly protective for a wide majority of unloading applications encountered by dump trucks, the latter position shown in FIG. 5 is essentially completely protective of the mud flaps 22 during any typical unloading or backing circumstance. Both positions represent an improvement over the prior art in the degree of protection and/or the comparative simplicity and low cost of installation, operation and construction.

Figure 6:
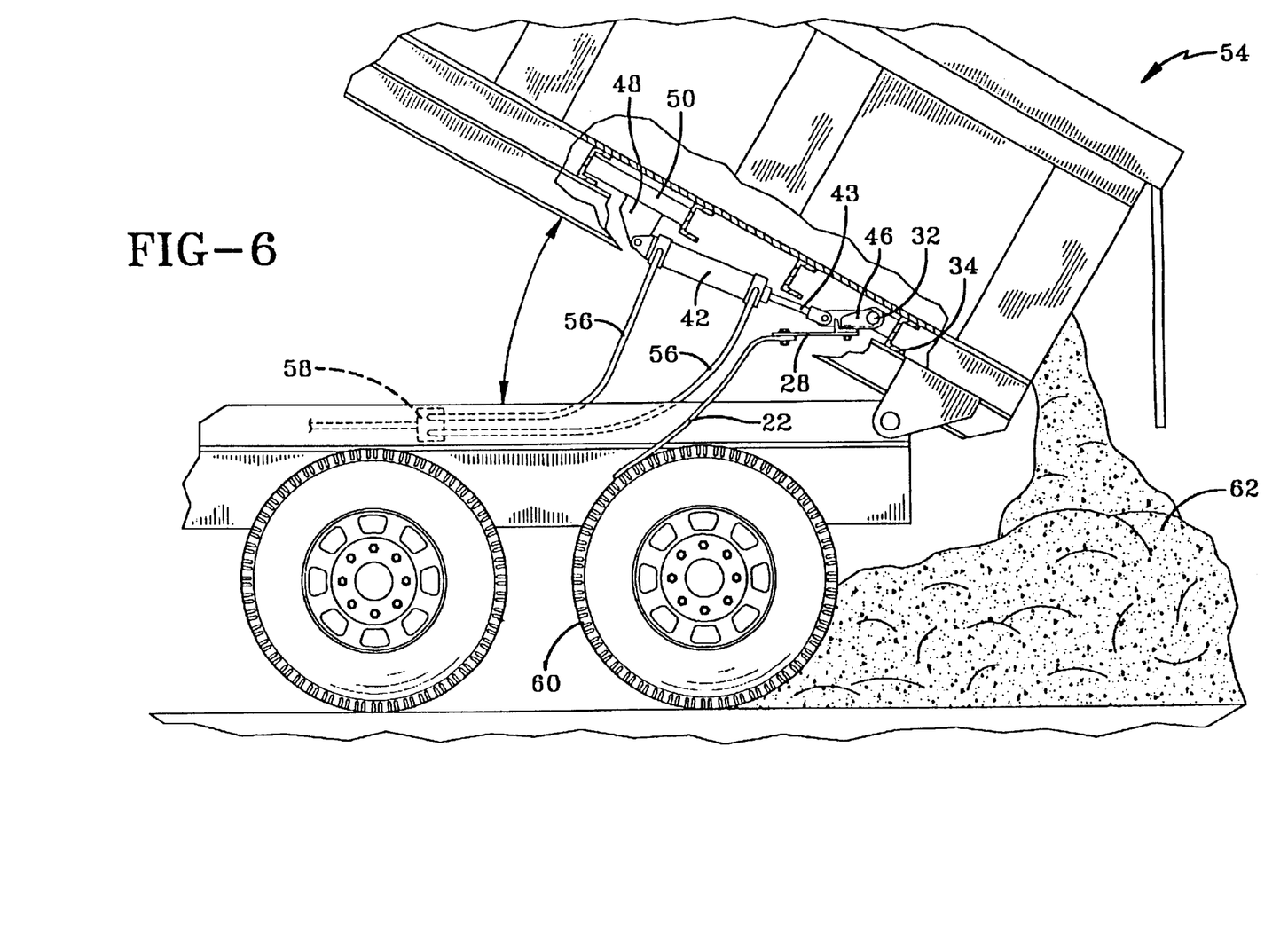
FIG. 6 is a partial side view similar to FIG. 5 illustrating the position of the mud flap when the truck bed is tilted rearwardly to an unloading position and dumps its contents upon the ground.

Now referring to FIG. 6, the dump truck bed 54 is shown in a typical rearwardly tilted condition during dumping of a load. It should be noted that with the mud flaps 22 in the position shown in FIG. 5, they remain in contact with the forwardly facing circumference of tire 60 and fully protected from any contact with the material pile 62 which often tends to spill forwardly and build up against the rear tires 60. However, it should be noted that even when the mud flaps 22 are in the position shown in FIG. 4, the lower end portion is raised and less likely to be contacted by the load. Even is contacted, damage is less likely to occur since the loop formed in the mud flap provides a significant measure of relief from any tension caused by the load contacting mud flap 22.

Another generally more hazardous circumstance occurs during road paving operations wherein the rear tires of the dump truck are pushed into engagement with a typical paving box used in such road paving operations. Those devices which merely raise the mud flaps rearwardly and upwardly, such as shown in the prior patents referenced earlier herein, are still subject to damage because they still extend rearwardly toward the load materials being dumped.

Figure 7:
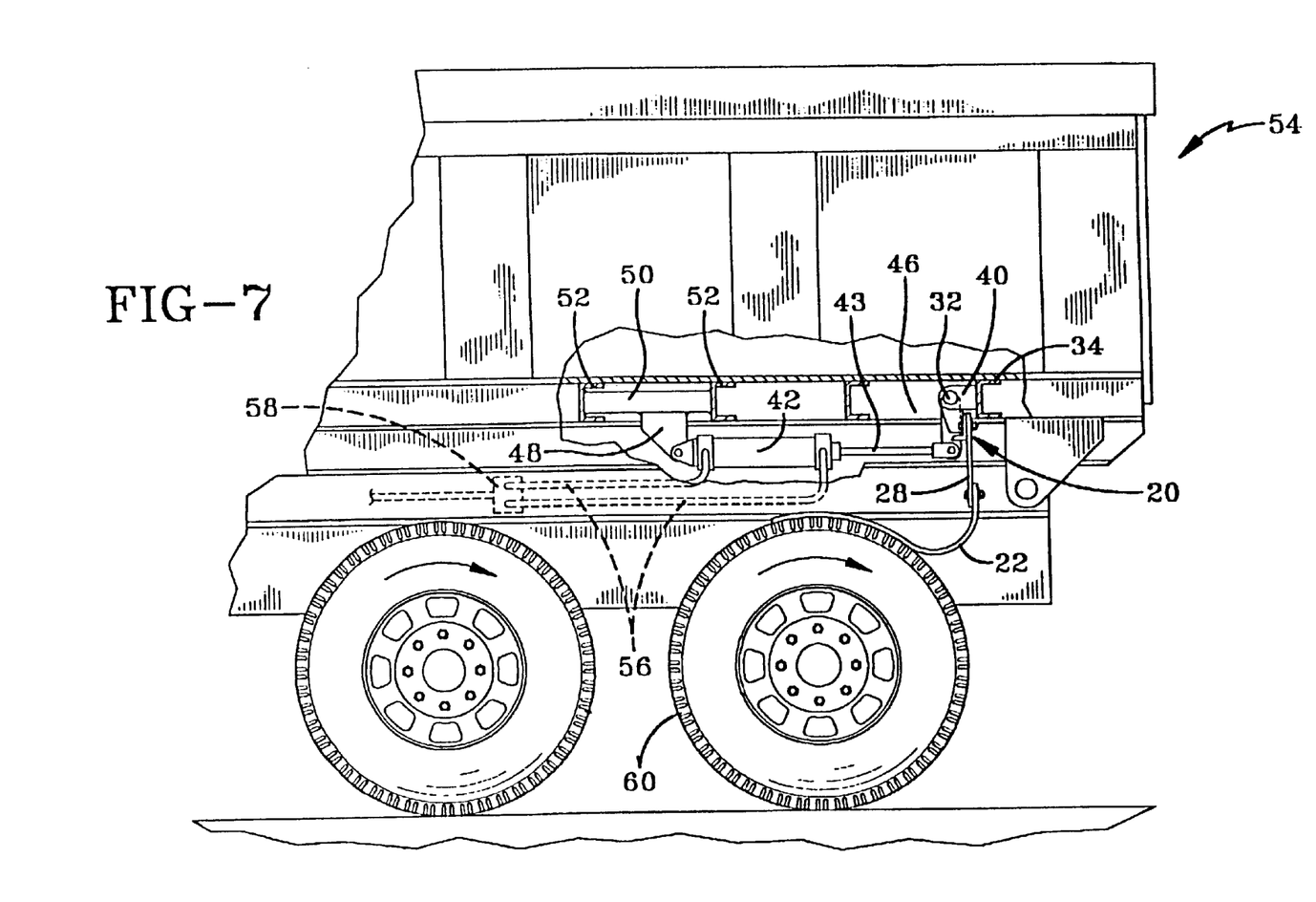
FIG. 7 is a view similar to the preceding Figures illustrating the truck bed returned to its normal horizontal position and the mounting plate pivoted rearwardly relative to the position shown in FIG. 5 to its normal original position and the mud flap being drawn rearwardly to form an oppositely directed U-shaped configuration relative to that shown in FIG. 4.

Upon returning the truck bed 54 to its normal horizontal traveling configuration, mud flaps 22 are returned to the position shown in FIG. 5. As seen in FIG. 7, the truck operator may return the mud flaps to the normal position as shown in FIG. 2 by actuating cylinder assembly 42 to extend rod 43 rearwardly. This is preferably performed after the truck has moved away from the unloading location to a position providing clearance to back up. The extension of rod 43 causes counterclockwise rotation of shaft 32 and pivoting of plate 28 rearwardly to its original starting position as shown in FIG. 7. Then the truck operator may back the truck up a short distance causing clockwise rotation of tires 60 as seen in FIG. 7. The frictional engagement between the mud flaps 22 and tires 60 pulls mud flaps 22 rearwardly over tires 60 until the lower or trailing end is free to fall to its normal vertical position such as shown in FIG. 2. Then the truck, with the mud flaps 22 in their normal operating position, is ready for legal road travel.

It should be pointed out that in the preferred embodiment such as shown in FIG. 2, cylinder assembly 42 may be conveniently communicated to either an air or hydraulic power source conventionally provided on dump trucks as well as other forms of truck beds, which is illustrated by tubing or hoses 56 conventionally communicated to a line in a fluid circuit 58. Those skilled in the art recognize other conventional and well-known means may be employed to supply power to an actuator without departing from the spirit of the present invention.

It should also be noted that other well-known mechanical means may be employed in lieu of the pivotally mounted plate 28 and shaft 32 to effect the desired movement of mud flaps 22 as described. For example, mud flaps 22 may be operatively connected to a slidable support mounted to the underside of the truck to effect forward and rearward movement of the mud flaps 22 into the positions described. However, it is believed the pivoted embodiment shown and described herein is preferred for simplicity and for space saving installation.

While certain preferred embodiments of the present invention have been disclosed in detail, it is to be understood that various modifications may be adopted without departing from the spirit of the invention or scope of the following claims.

What is claimed is:

1. In combination with a truck having front and rear tires, a pair of mud flaps mounted to an underside of said truck behind said rear tires;

a top portion of each of said mud flaps being fixed to a downwardly depending mounting member;

said mounting member being movably mounted to said underside of said truck to cause said mounting member to selectively move said mud flaps between a normal operating position disposed in a generally vertical planar configuration behind said rear tires and a position disposed generally in a U-shaped configuration in engagement with said rear tires.

2. The combination defined in claim 1 wherein said mounting member is connected for pivotal movement toward and away from said front tires to cause said mud flaps to move into said U-shaped configuration engaging said rear tires.

3. The combination defined in claim 2 wherein said mounting member includes a laterally disposed shaft rotatably mounted to said underside of said truck, at least one downwardly extending plate fixed to said shaft and rotatable with said shaft, wherein an upper portion of said mud flaps are fixed to said at least one downwardly depending plate.

4. The combination defined in claim 1 including an actuator operatively connected to said mounting member to cause said mounting member to move toward and away from said rear tires.

5. The combination defined in claim 2 further including an actuator operatively connected to said shaft to cause rotation of said shaft.

6. The combination defined in claim 5 wherein said actuator includes a cylinder and piston assembly operatively connected to said shaft.

7. A method of moving a mud flap mounted to a truck between a normal operating position disposed in a generally vertical, planar configuration behind a rear tire of said truck and a position tending to minimize the occurrence of damage to said mud flap during certain unloading applications, comprising the steps of:

a) causing said mud flap to move from said normal operating position toward said rear tire and into frictional engagement with said rear tire causing said mud flap to assume a generally U-shaped configuration wherein a lower end portion of said mud flap is raised to a higher position compared to its normal operating position; and b) causing said mud flap to move in a direction away from said rear tire and out of engagement therewith to return said mud flap to its normal operating position.

8. The method defined in claim 7 further including the step of:

c) after the step defined in paragraph (a), causing said rear tire to rotate in a forward direction at a speed sufficient to cause said mud flap to be drawn over said tire to a position wherein said lower end portion is disposed over a forward facing side of the circumference of said rear tire.

9. A method of moving a mud flap connected to a truck between a normal operating position disposed in a generally vertical, planar configuration behind a rear tire of said truck and a position tending to reduce damage to said mud flap upon backing up said truck and during certain unloading applications, comprising the steps of:

a) causing said mud flap to move from said normal operating position and into a second position defined as frictionally engaging said rear tire wherein said mud flap assumes a generally U-shaped configuration with a lower end portion of said mud flap raised to a higher position compared to its normal operating position;

b) after the step defined in paragraph (a), causing said rear tire to rotate in a forward direction at a speed sufficient to cause said mud flap to be moved over said tire to a third position wherein said lower end portion is Disposed over an opposite side of the circumference of said tire;

c) causing said mud flap to move from the position defined in paragraph (b) in a rearwardly direction along said tire to assume a generally U-shaped configuration with the open end of said U-shaped configuration facing oppositely to the U-shaped configuration set forth in paragraph (a); and d) causing said rear tire to rotate in a rearward direction at a speed sufficient to cause said mud flap to return to its normal operating position.

* * * * *